(12) United States Patent
Haas et al.

(10) Patent No.: US 9,551,377 B2
(45) Date of Patent: Jan. 24, 2017

(54) CRANKSHAFT OR CONNECTING-ROD BEARING ASSEMBLY OF AN INTERNAL COMBUSTION ENGINE

(71) Applicants: Roland Haas, Schweinfurt (DE); Yvonne Koehler, Würzburg (DE); Armin Olschewski, Schweinfurt (DE); Volker Wendt, Üchtelhausen/Zell (DE)

(72) Inventors: Roland Haas, Schweinfurt (DE); Yvonne Koehler, Würzburg (DE); Armin Olschewski, Schweinfurt (DE); Volker Wendt, Üchtelhausen/Zell (DE)

(73) Assignee: AKTIEBOLAGET SKF, Gothenburg (SE)

( * ) Notice: Subject to any disclaimer, the term of this patent is extended or adjusted under 35 U.S.C. 154(b) by 79 days.

(21) Appl. No.: 14/801,052

(22) Filed: Jul. 16, 2015

(65) Prior Publication Data
US 2016/0017919 A1 Jan. 21, 2016

(51) Int. Cl.
| | |
|---|---|
| *F16C 33/54* | (2006.01) |
| *F16C 9/02* | (2006.01) |
| *F16C 9/04* | (2006.01) |
| *F16C 9/00* | (2006.01) |
| *F16C 33/50* | (2006.01) |
| *F16C 19/26* | (2006.01) |
| *F16C 19/46* | (2006.01) |

(52) U.S. Cl.
CPC ............... *F16C 33/547* (2013.01); *F16C 9/00* (2013.01); *F16C 9/02* (2013.01); *F16C 9/04* (2013.01); *F16C 33/504* (2013.01); *F16C 33/542* (2013.01); *F16C 19/26* (2013.01); *F16C 19/463* (2013.01)

(58) Field of Classification Search
CPC ...... F16C 33/46; F16C 33/4694; F16C 33/542
See application file for complete search history.

(56) References Cited

U.S. PATENT DOCUMENTS

| | | | | |
|---|---|---|---|---|
| 1,921,488 A | * | 8/1933 | Smith | F16C 9/04 384/570 |
| 2,894,791 A | | 7/1959 | White et al. | |
| 3,306,685 A | * | 2/1967 | Bixby | F16C 33/425 384/533 |

(Continued)

FOREIGN PATENT DOCUMENTS

| | | |
|---|---|---|
| DE | 7322195 U | 1/1975 |
| DE | 3821037 A1 | 12/1989 |

(Continued)

*Primary Examiner* — Thomas R. Hannon
(74) *Attorney, Agent, or Firm* — Bryan Peckjian; SKF USA Inc. Patent Dept.

(57) ABSTRACT

A crankshaft or connecting-rod bearing assembly of an internal combustion engine includes a bearing journal configured to function as a bearing inner ring, and a bearing outer ring surrounds the bearing journal. At least one row of rolling elements is disposed between the bearing journal and the bearing outer ring, the rolling elements are held by a cage, and the cage includes at least two cage segments, each of which extends around a circumferential section of the bearing journal. Furthermore, the at least two cage segments are connected to each other in a materially-bonded manner at at least one joint lying in the circumferential direction.

20 Claims, 3 Drawing Sheets

(56) References Cited

U.S. PATENT DOCUMENTS

| | | | | |
|---|---|---|---|---|
| 3,353,246 | A * | 11/1967 | Farmer | B21D 53/12 |
| | | | | 29/898.067 |
| 3,902,772 | A * | 9/1975 | Spate | F16C 19/46 |
| | | | | 384/579 |
| 5,062,719 | A | 11/1991 | Bauer et al. | |
| 5,528,706 | A * | 6/1996 | Harimoto | B21D 53/12 |
| | | | | 384/523 |
| 8,770,854 | B2 * | 7/2014 | Friedrich | F16C 33/545 |
| | | | | 384/579 |
| 2012/0207422 | A1 * | 8/2012 | Fukami | F16C 33/504 |
| | | | | 384/577 |

FOREIGN PATENT DOCUMENTS

| | | |
|---|---|---|
| DE | 4220515 A1 | 1/1993 |
| DE | 102004054128 A1 | 5/2006 |
| JP | 200583431 | 10/2006 |
| JP | 2007247856 A | 9/2007 |
| JP | 200764304 A | 9/2008 |
| JP | 2013160263 A | 8/2013 |

* cited by examiner

CRANKSHAFT OR CONNECTING-ROD BEARING ASSEMBLY OF AN INTERNAL COMBUSTION ENGINE

CROSS-REFERENCE

This application claims priority to German patent application no. 10 2014 213 883.3 filed on Jul. 16, 2014, the contents of which are fully incorporated herein by reference.

TECHNOLOGICAL FIELD

The disclosure is directed to a crankshaft or connecting-rod bearing assembly of an internal combustion engine. The assembly has a bearing journal that functions as a bearing inner ring and a bearing outer ring that surrounds the bearing journal. At least one row of rolling elements is disposed between the bearing journal and the bearing outer ring, and the rolling elements are held by a cage comprised of at least two cage segments. The segments each extend around a circumferential section of the bearing journal.

BACKGROUND

Crankshaft bearing journals and connecting rods are typically supported on a crankshaft by sliding bearings. Alternately, rolling-element bearing assemblies are sometimes used in these locations, and these assemblies include cage segments for guiding and holding the rolling elements. The cage segments and the rolling elements are placed between the to-be-supported journals and the surrounding housing, and the housing functions as the bearing outer ring. Each cage segment extends over a predetermined circumferential region of the to-be-supported journal; for example, at least two cage segments, each of which extends over a 180° circumferential angle, may be used.

The cage segments are placed around the to-be-supported journals and placed into the surrounding outer ring.

A disadvantage of this conventional arrangement is that a non-negligible amount of friction sometimes exists. Furthermore, the stability of the bearing assembly is not always optimal.

SUMMARY

A first aspect of the disclosure is to further develop a crankshaft or connecting-rod bearing assembly of the above-described type for an internal combustion engine to provide low-friction and stable support of the journal or of the crankshaft.

The solution is characterized in that the at least two cage segments are connected to each other in a materially-bonded manner at at least one joint that lies in the circumferential direction. In other words, the joint is formed between circumferentially spaced end regions of the at least two cage segments.

The materially-bonded connection is preferably a welded connection or a soldered connection, in particular a brazed connection. A soldered connection is somewhat less rigid than a welded connection, and this may be advantageous for accommodating the shocks and vibrations that occur in internal combustion engines. The materially-bonded connection could also conceivably be an adhesive connection.

The two cage segments that meet at the junction preferably overlap in the circumferential direction. For this purpose the two end regions of the two cage segments can be formed such that they are complementary to each other.

According to a preferred exemplary embodiment, one end region of one cage segment may be formed (or deformed) to extend in a radially outward direction, and the other end region may be formed (or deformed) to extend in a radially inward direction. Here the two end regions preferably form a step in the radial direction.

The cage segment can include an opening near the junction in order to provide stress relief. The opening can be slot-shaped and extend transversely across the cage segment in the axial direction. When a slot-shaped opening is used, its length is preferably selected to be at least 50% of the width of the cage segment. The slot helps maintain an optimal shape of an adjacent pocket because the slot helps keep stresses away from the pocket.

The opening is preferably disposed circumferentially between the last receiving pocket of a cage segment and a circumferential end of the cage segment.

The opening preferably completely penetrates the cage segment and is preferably produced by a punching process.

The cage segments can have a trough-shaped contour in a section perpendicular to the circumferential direction.

The cage preferably includes two cage segments.

The rolling elements are preferably cylindrical rollers or needle rollers.

As already mentioned above, the bearing outer ring according to the present disclosure can also be realized by a connecting rod or a connecting-rod big end (eye); the bearing outer ring thus need not by any means be a separate component. In this case the bore in the connecting rod or in the crankshaft housing is or forms the raceway for the rolling elements.

The proposed bearing assembly may be used in connection with an internal combustion engine crankshaft, where the bearing journals of the crankshaft itself and/or the bearing journals for the connecting rod can be correspondingly embodied. However, it is also possible to support the camshaft of the internal combustion engine in the same way. In the latter case the bearing located at the camshaft in the cylinder head can be embodied in a similar manner.

The proposed solution produces a highly stable cage and guides the rolling elements in a stable manner to achieve a relatively low bearing friction.

The stability is ensured by the materially-bonded connection of the abutting ends or end regions of the cage segment. In this way it is advantageously ensured that no radial springing back of the cage can result, particularly under load. The guiding of the rolling elements is thus substantially improved, and the friction of the bearing assembly can be advantageously reduced. Finally the runout of the cage is also advantageously improved.

BRIEF DESCRIPTION OF THE DRAWINGS

Exemplary embodiments of the disclosure are depicted in the drawings.

DETAILED DESCRIPTION

An axial section through a bearing journal 1 of a crankshaft of an internal combustion engine is illustrated in FIG.

Figure 1:
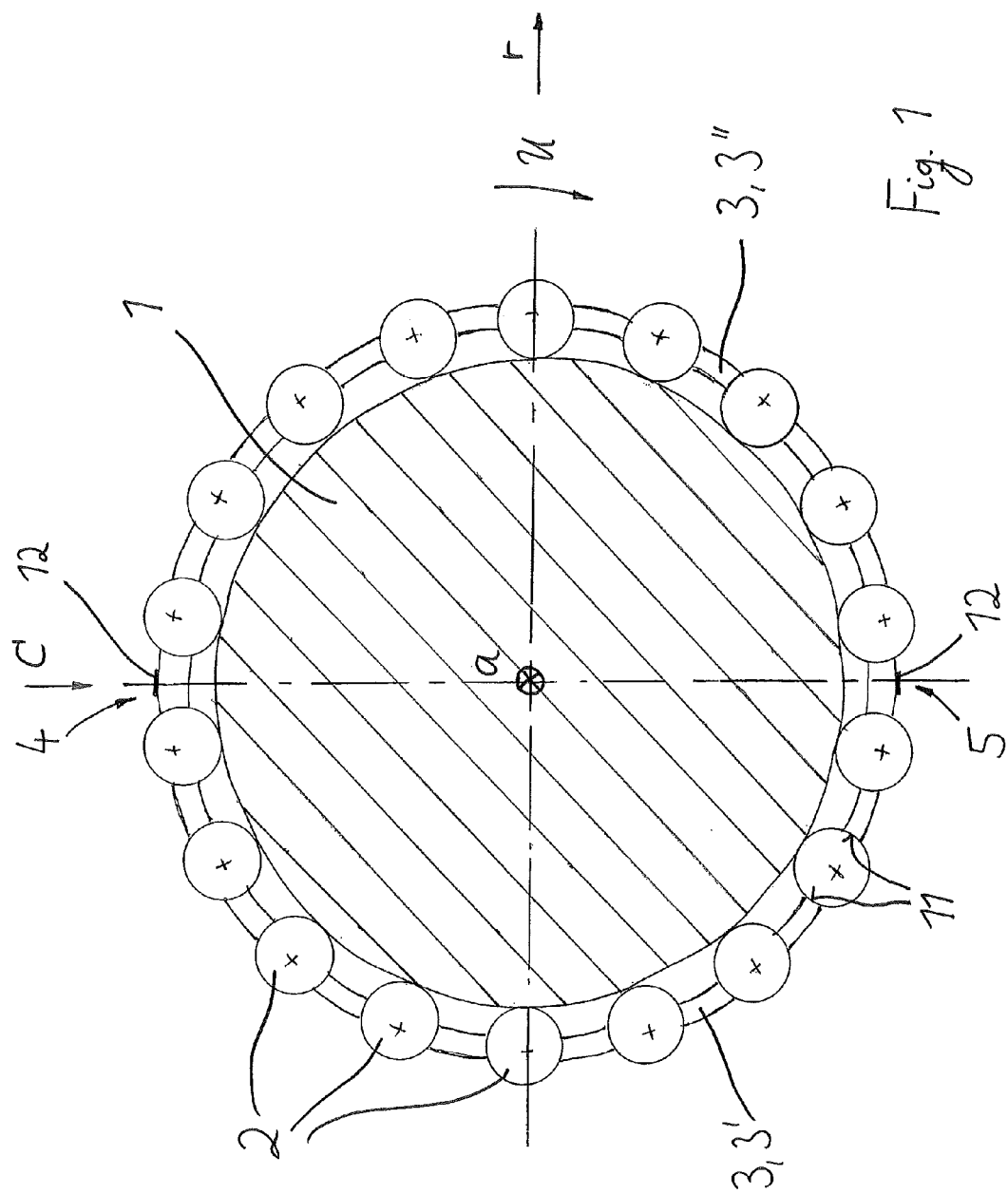
FIG. 1 is a sectional view of a bearing journal of a crankshaft that is configured to be supported by a crankshaft bearing assembly in a housing of an internal combustion engine.

1 which shows the bearing journal 1 and a row of rolling elements 2 surrounding the bearing journal 1. The individual rolling elements 2 are held by a cage 3, which in the present embodiment is comprised of two cage segments 3' and 3". The two cage segments 3' and 3" abut at two diametrically opposite joints 4 and 5. The two joints 4 and 5 are thus offset by 180° in a circumferential direction U, that is, they are located at circumferentially spaced ends of the two cage segments 3' and 3". Arrow "r" in FIG. 1 identifies the radial direction, and arrow "a" the axial direction, where the axial direction a is perpendicular to the plane of the drawing in FIG. 1.

The two cage segments 3' and 3" include a number of receiving pockets 11, and each pocket is configured to receive one of the rolling elements 2.

Figure 2:
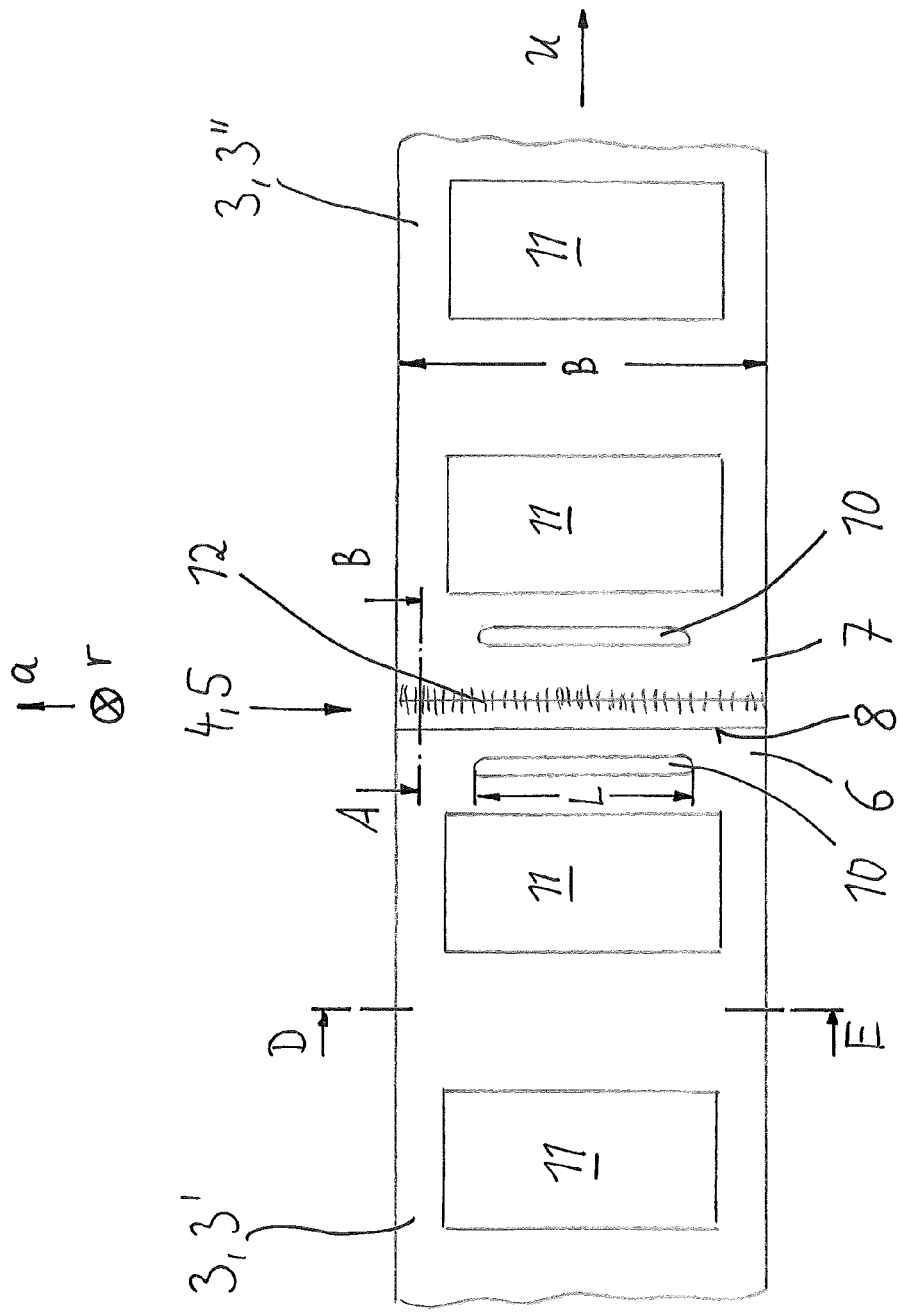
FIG. 2 is a view in direction "C" of FIG. 1 of a section of the cage.
Figure 4:
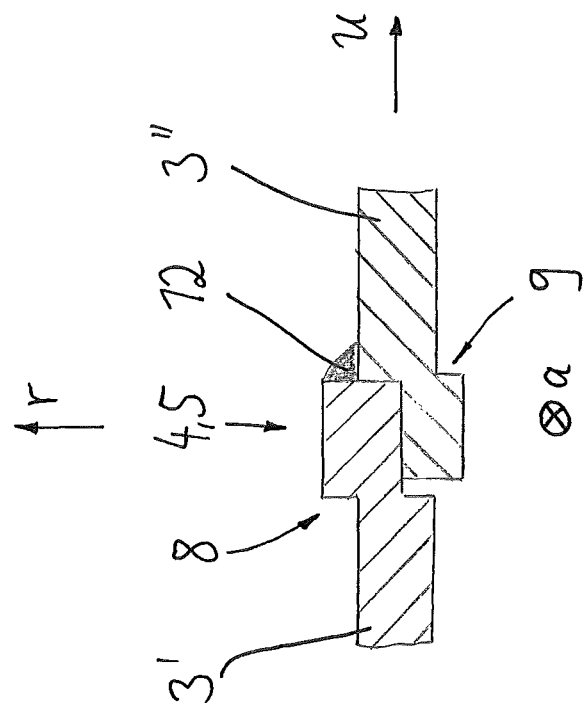
FIG. 4 is a sectional view along line section A-B of FIG. 2 through the cage.

FIGS. 2 and 4 illustrate how the two cage segments 3' and 3" are connected to each other at the two joints 4 and 5.

To facilitate this connection, the cage segments 3', 3" each include offsets at their end regions 6 and 7 as can be seen in FIG. 4. The end of the left-side cage segment 3' in FIG. 4 is offset radially outward, and the end of the right-side cage segment 3" is offset radially inward to produce two steps 8 and 9. Overall the step-shaped formations substantially complement each other so that the basic contour of the cage extends substantially continuously over the joint 4, 5.

A fixed connection is produced by applying a weld seam 12 externally to the joint 4, 5 so that a rigid and stable cage structure results.

The step-shaped formations are preferably produced by the process that forms the metal-plate from which the cage segments 3', 3" are manufactured.

In FIG. 2 it can be seen that an opening 10 is provided in the cage segments 3', 3" near the joint 4, 5. In the exemplary embodiment the opening 10 is a slot-shaped contour that has been introduced into the material of the cage segment 3', 3" by punching. The length L of the opening (in the axial or width direction of the cage 3) is 50% or more of the width B of the cage segment 3', 3".

Figure 3:
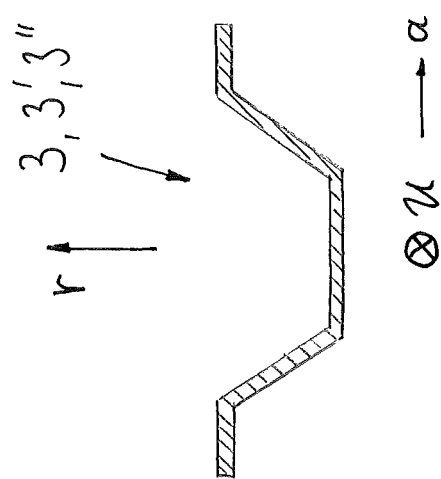
FIG. 3 is sectional view along line D-E of FIG. 2 through the cage.

The opening 10 functions as a stress-relief element which is useful especially when the cage segments 3', 3" are profiled over least a substantial portion of their circumference. An example of such profiling is illustrated in FIG. 3. The profiled cage segment 3', 3" has a trough-shape d design in a section D-E, which gives it a relatively rigid structure.

Before this structure reaches the end region 6, 7, the cage segment 3', 3" transitions into a rectangular-strip-shaped contour, and the transition from the trough shape to the strip shape occurs at the location of the opening 10.

The bearing described is preferably used at a location for supporting the crankshaft in a housing of an internal combustion engine. The bearing can be used in the same way to support a connecting rod by its big-end bore (eye) on the journal which is a component of the crankshaft.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing journal
2 Rolling elements
3 Cage
3' Cage segment
3" Cage segment
4 Joint
5 Joint
6 End region of the cage segment
7 End region of the cage segment
8 Step
9 Step
10 Opening (slot)
11 Receiving pocket
12 Weld seam
U Circumferential direction
r Radial direction
a Axial direction
L Length of the opening
B Width of the cage segment

The invention claimed is:
1. A crankshaft or connecting-rod bearing assembly of an internal combustion engine, comprising:
a bearing journal configured to function as a bearing inner ring, and
a bearing outer ring surrounding the bearing journal, wherein at least one row of rolling elements is disposed between the bearing journal and the bearing outer ring, wherein the rolling elements are held by a cage, wherein the cage comprises at least two cage segments, each of the at least two cage segments extending around a circumferential section of the bearing journal, and wherein the at least two cage segments are connected to each other in a materially-bonded manner at at least one joint between circumferential ends of the at least two cage segments, such that a first end region of a first one of the at least two cage segments is offset radially outward, and a first end region of a second one of the at least two cage segments is offset radially inward and connected to the first end region of the first one of the at least two cage segments.
2. The crankshaft or connecting-rod bearing assembly according to claim 1, wherein the materially-bonded connection is a welded connection or a soldered connection or a brazed connection.

3. The crankshaft or connecting-rod bearing assembly according to claim 1, wherein the at least two cage segments abut at the at least one joint and overlap in a circumferential direction.

4. The crankshaft or connecting-rod bearing assembly according to claim 3, wherein that at least two cage segments each have a first end and a second end and wherein the first end is configured to be complementary to the second end, at least in sections.

5. The crankshaft or connecting-rod bearing assembly according to claim 3, wherein a second end region of the second one of the at least two cage segments is offset radially outward, and a second end region of the first one of the at least two cage segments is offset radially inward.

6. The crankshaft or connecting-rod bearing assembly according to claim 5, wherein the first end region and the second end region form a step in the radial direction.

7. The crankshaft or connecting-rod bearing assembly according to claim 1, wherein at least one of the at least two cage segments includes a pocket configured to receive one of the at least one rolling elements and at least one opening near the joint, the at least one opening being axially and circumferentially smaller than the at least one pocket.

8. The crankshaft or connecting-rod bearing assembly according to claim 7, wherein the at least one opening is slot-shaped and extends in an axial direction across the cage segment.

9. The crankshaft or connecting-rod bearing assembly according to claim 8, wherein a length of the slot-shaped opening is at least 50% of an axial width of the cage segment.

10. The crankshaft or connecting-rod bearing assembly according to claim 7, wherein the at least one opening is circumferentially located between the at least one pocket and a circumferential end of the cage segment with no other pockets of the at least one pocket being located between the at least one opening and the circumferential end of the cage segment.

11. The crankshaft or connecting-rod bearing assembly according to claim 7, wherein the opening completely penetrates the cage segment.

12. The crankshaft or connecting-rod bearing assembly according to claim 1, wherein the at least two cage segments each have a trough-shaped contour in a section perpendicular to the circumferential direction.

13. The crankshaft or connecting-rod bearing assembly according to claim 1, wherein the at least two cage segments comprise no more than two cage segments.

14. The crankshaft or connecting-rod bearing assembly according to claim 1, wherein the rolling elements are cylindrical rollers or needle rollers.

15. The crankshaft or connecting-rod bearing assembly according to claim 1, wherein one of the at least two cage segments includes a through opening between a pocket of one of the at least two cage segments configured to receive one of the at least one rolling elements and an end of the one of the at least two cage segments, the at least one opening being slot-shaped and extending in an axial direction across the cage segment over at least 50% of an axial width of the cage segment and being axially and circumferentially smaller than the at least one pocket, and wherein the at least two cage segments each have a trough-shaped contour in section perpendicular to the circumferential direction.

16. The crankshaft or connecting-rod bearing assembly according to claim 15, wherein the materially-bonded connection is a welded connection or a soldered connection or a brazed connection, wherein the at least two cage segments abut at the at least one joint and overlap in a circumferential direction, wherein the at least two cage segments each have a first end and a second end and wherein the first end is configured to be complementary to the second end, at least in sections, wherein a first end region of a first one of the at least two cage segments is offset radially outward, and a second end region of the first one of the at least two cage segments is offset radially inward relative to a body of the first one of the at least two cage segments, and wherein the first end region and the second end region form a step in the radial direction.

17. A crankshaft or connecting-rod bearing assembly of an internal combustion engine, comprising:
    a bearing journal configured to function as a bearing inner ring,
    a bearing outer ring surrounding the bearing journal,
    at least one row of rolling elements disposed between the bearing journal and the bearing outer ring, and
    a cage holding the rolling elements, the cage comprising first and second cage segments, each of the first and second cage segments having first and second circumferentially spaced ends, the first end of the first cage segment being welded, brazed or soldered to the first end of the second cage segment, such that a first end region of the first cage segment is offset radially outward, and a first end region of the second cage segment is offset radially inward and connected to the first end region of the first cage segment.

18. The crankshaft or connecting-rod bearing assembly according to claim 17, wherein the first end of the first cage segment overlaps the first end of the second cage segment.

19. The crankshaft or connecting-rod bearing assembly according to claim 17, wherein the first cage segment comprises a plurality of pockets, each pocket of the plurality of pockets being configured to receive one of the rolling elements of the at least one row of rolling elements, and a through opening axially and circumferentially smaller than the pockets of the plurality of pockets, the through opening being located between one of the pockets of the plurality of pockets and a circumferential end of the cage segment with no other pocket of the plurality of pockets being located between the through opening and the circumferential end of the cage segment.

20. The crankshaft or connecting-rod bearing assembly according to claim 19, wherein the at least two cage segments each include a plurality of radially directed trough-shaped indentations around a circumference of each of the at least two cage segments and wherein the through opening is located at a transition from one of the trough-shaped indentations to a circumferential portion of the at least two cage segments without a trough-shaped indentation.

* * * * *